Jan. 14, 1958   J. HAMMERSTROM   2,819,657
PROCESS AND MACHINE FOR CUTTING, OFFSETTING AND
PRESSING PAPER BANDS
Filed April 22, 1955   5 Sheets-Sheet 1
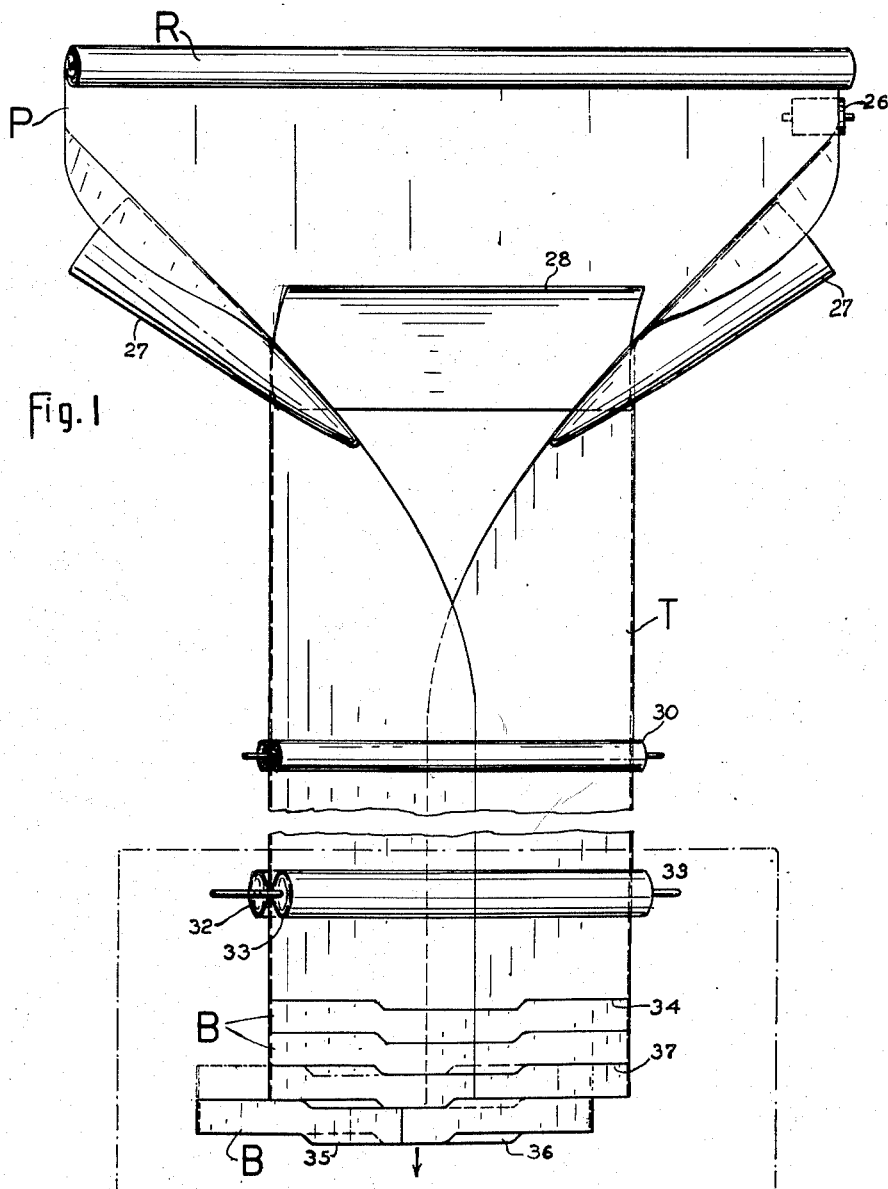
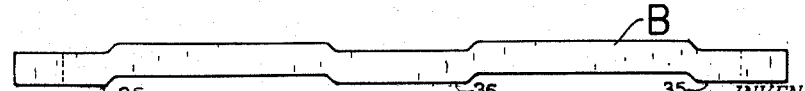
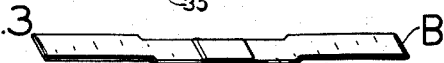
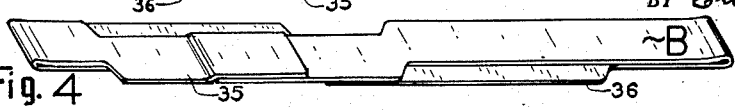
INVENTOR.
JOHN HAMMERSTROM
BY Chas. T. Hawley
ATT'Y.

Jan. 14, 1958 J. HAMMERSTROM 2,819,657
PROCESS AND MACHINE FOR CUTTING, OFFSETTING AND
PRESSING PAPER BANDS
Filed April 22, 1955 5 Sheets-Sheet 2

INVENTOR.
JOHN HAMMERSTROM.
BY Chas. T. Hawley
ATT'Y.

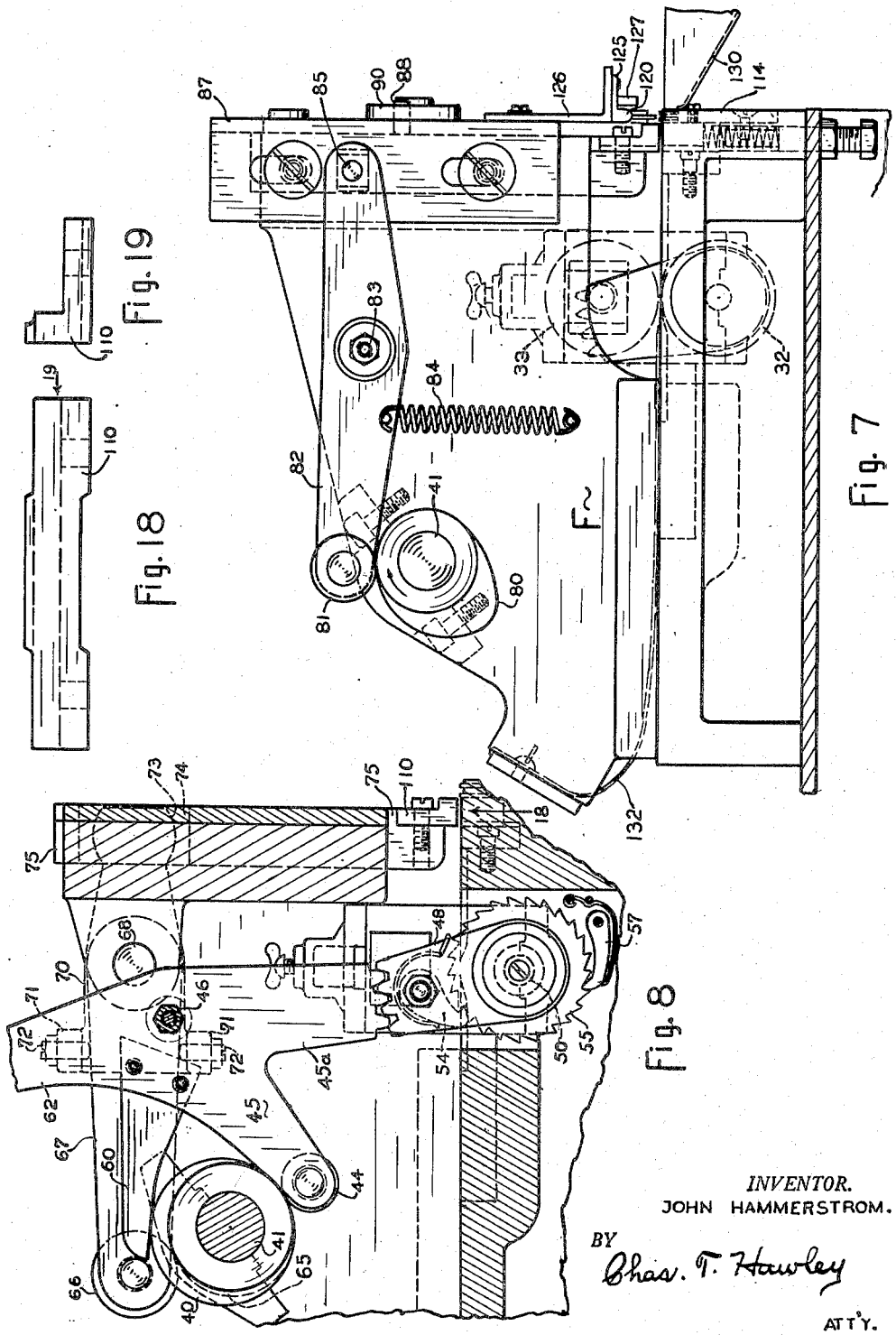

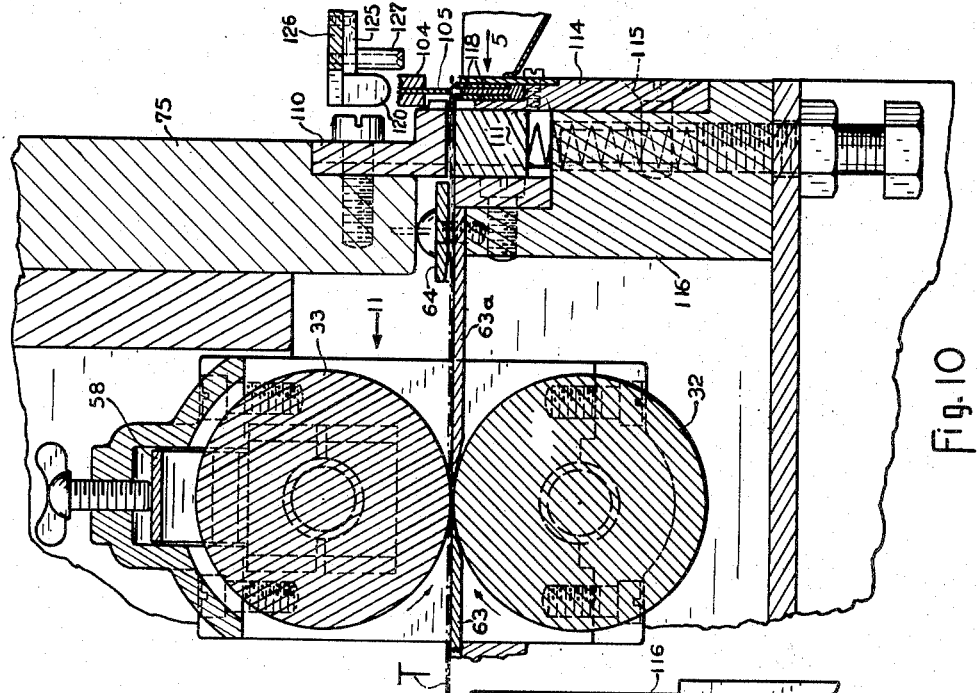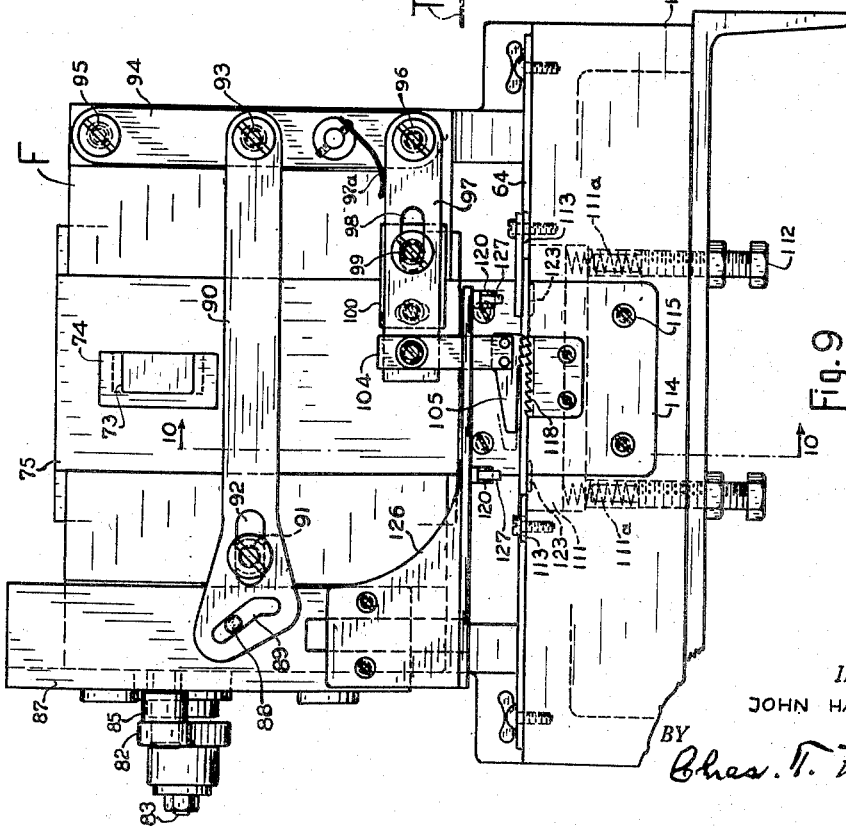

Jan. 14, 1958 J. HAMMERSTROM 2,819,657
PROCESS AND MACHINE FOR CUTTING, OFFSETTING AND
PRESSING PAPER BANDS
Filed April 22, 1955 5 Sheets-Sheet 5
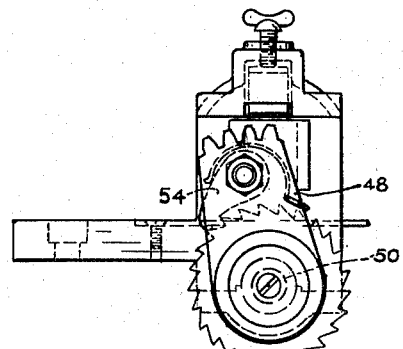
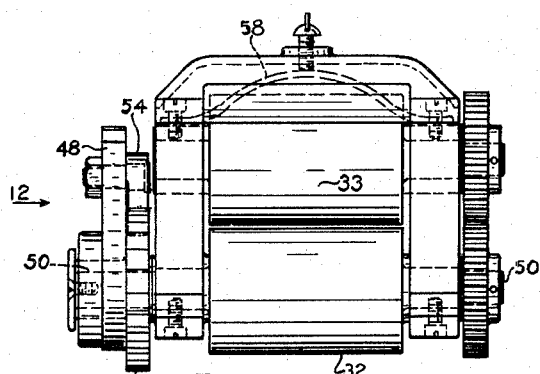
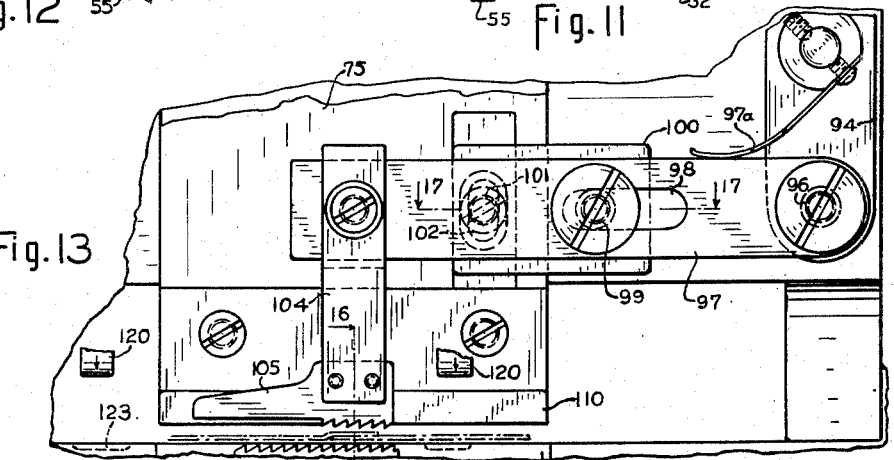
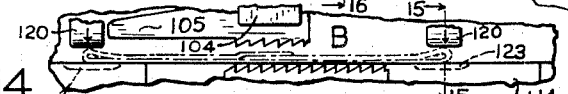
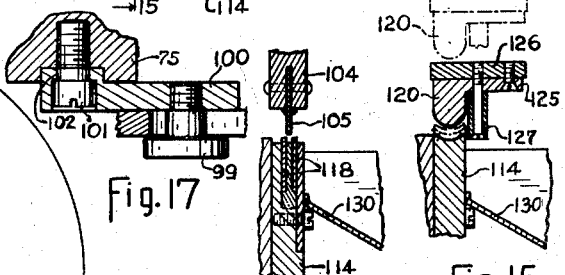
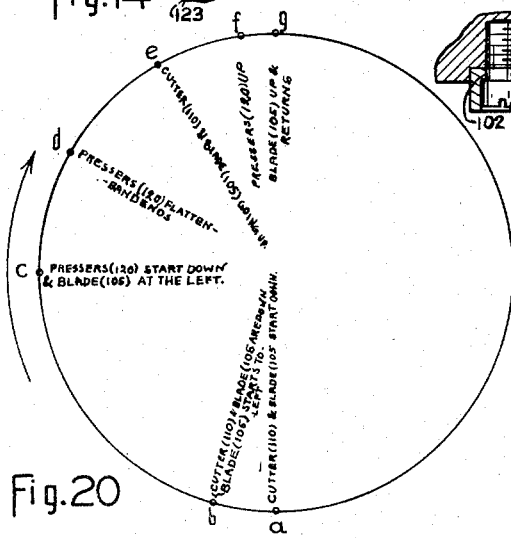
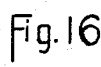
INVENTOR.
JOHN HAMMERSTROM.
BY
Chas. T. Hawley
ATT'Y.

United States Patent Office 2,819,657
Patented Jan. 14, 1958

2,819,657

PROCESS AND MACHINE FOR CUTTING, OFFSETTING AND PRESSING PAPER BANDS

John Hammerstrom, Trumbull, Conn., assignor to Ellen J. Peterson, Worcester, Mass.

Application April 22, 1955, Serial No. 503,303

3 Claims. (Cl. 93—1)

This invention relates to the production of paper bands such as are used in packaging paper money in banks, stores and other similar places where large amounts of paper money are used.

It is customary to assemble this paper money in stacks or bunches of established amounts, and to place a narrow paper-band about each such stack or bunch to maintain the count. The bands commonly used for such purposes are straight and flat and are not well adapted for easy opening.

It is the general object of this invention to provide an improved process for making a type of band which may be more quickly and easily opened. I have also invented an improved machine by the use of which my improved process may be carried out.

Briefly stated, my invention relates to the production of paper-bands having aligned tabs at one edge of each band, to the relative lengthwise shifting of one layer only of the band to dis-align the tabs, and to the pressing of each band while in shifted condition, in order to maintain the new and dis-aligned status of the tabs.

In my new machine, I have provided improved mechanism for automatically carrying out the above-defined operations and particularly for dis-aligning the tabs and for maintaining such dis-alignment.

My invention further relates to arrangements and combinations of parts which will be hereinafter described and more particularly pointed out in the appended claims.

A preferred form of the invention is shown in the drawings, in which:

Fig. 1 is a diagrammatic plan view illustrating the general operation of my improved machine;

Fig. 2 is a lay-out of a paper band projected at full length;

Fig. 3 is a perspective view of a band as first formed from a paper tube by the action of the cutting knife;

Fig. 4 is an enlarged perspective view of a finished band;

Fig. 7 is a side elevation, looking in the direction of the arrow 7 in Fig. 5;

Fig. 8 is a partial sectional side elevation, taken along the line 8—8 in Fig. 5;

Fig. 9 is a front elevation, looking in the direction of the arrow 9 in Fig. 5;

Fig. 10 is an enlarged partial sectional side elevation, taken along the line 10—10 in Fig. 9;

Fig. 11 is a detail front elevation of certain feeding apparatus, looking in the direction of the arrow 11 in Fig. 10;

Fig. 12 is an end elevation, looking in the direction of the arrow 12 in Fig. 11;

Fig. 13 is an enlarged front elevation of certain paper-shifting devices also shown in Fig. 9;

Fig. 14 is a view of certain of the parts appearing in Fig. 13 but in a different operative position;

Fig. 15 is a detail sectional view, taken along the line 15—15 in Fig. 14;

Fig. 16 is a detail sectional view, taken along the line 16—16 in Fig. 13;

Fig. 17 is a sectional view of a supporting plate, taken along the line 17—17 in Fig. 13;

Fig. 18 is a bottom view of the knife or cutter, looking in the direction of the arrow 18 in Fig. 8;

Fig. 19 is an end elevation, looking in the direction of the arrow 19 in Fig. 18; and Fig. 20 is an operation timing diagram.

Figure 5:
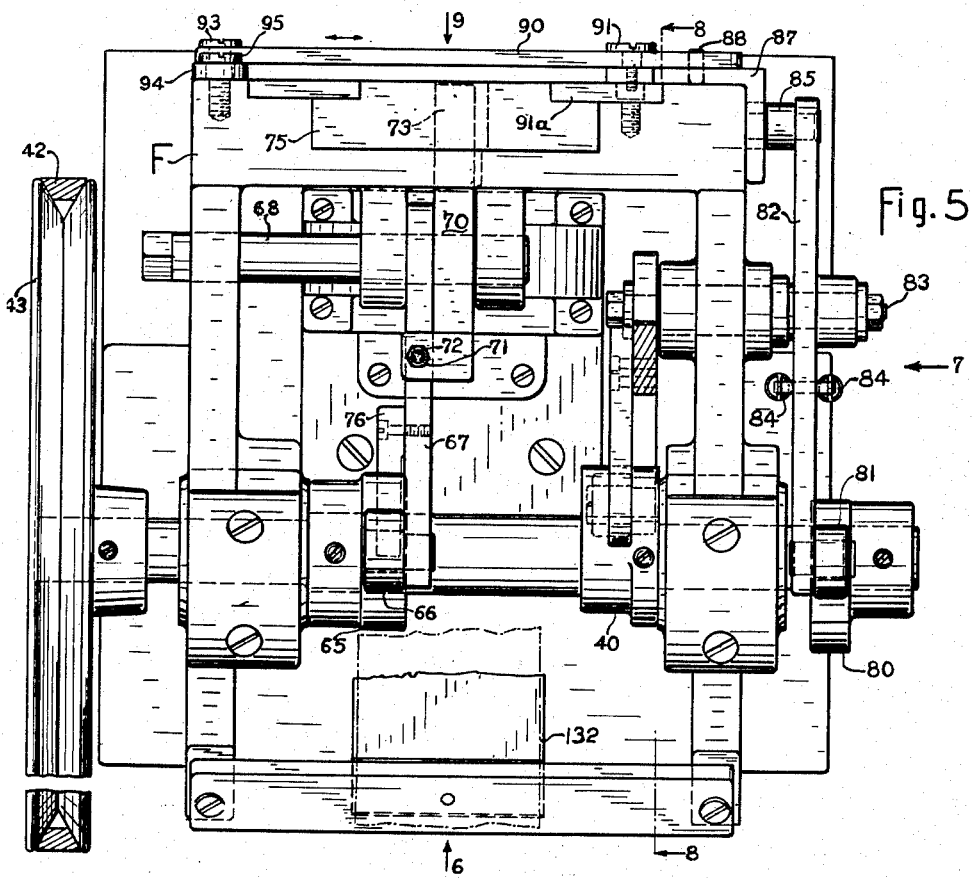
Fig. 5 is a plan view of the operating mechanism of my improved machine.

Briefly described, the operation of my improved machine is as follows:

The paper P (Fig. 1) is supplied in the form of a storage roll R mounted at the back of the machine and is drawn forward past a gluing roll 26 and past suitable folding devices 27 and 28. The paper leaves the folding devices in the form of a flat tube T with overlapping edges, and with the plain edge overlapping the glued edge.

The tube T is then drawn between a pair of presser rolls 30 and advances to intermittently-operated feed rolls 32 and 33.

The rolls 30 and 32—33 are substantially spaced apart lengthwise of the machine as indicated by the broken lines in Fig. 1 to provide time enough for the glue to set.

The tube T is then fed past a cutting station indicated diagramatically at 34, and successive separate bands B are chopped off in the form shown in Fig. 3, with projecting tabs 35 and 36 on the upper and lower layers of the band and in vertical alignment.

Each separate band B is then advanced to the point 37 (Fig. 1) and is engaged by transverse shifting mechanism by which the upper layer of the band and its tab 35 is shifted lengthwise of the band to bring the upper tab 35 out of alignment with the lower tab 36, as clearly shown on an enlarged scale in Fig. 4.

Pressing devices then flatten the band while in its shifted condition to maintain the shift, and the finished band is then discharged from the machine.

It will be obvious that with the tabs 35 and 36 out of vertical alignment, the bands B may be much more easily opened than the usual band which comprises two straight and narrow strips of material closely overlying each other and with perfectly straight edges.

Intermittent feeding mechanism

The intermittent feeding mechanism is best shown in Figs. 5, 8 and 10 to 12, and is actuated by an eccentric 40 (Fig. 8) mounted on a main shaft 41 which is continuously rotated in any convenient manner, as by a belt 42 and pulley 43 (Fig. 5).

The eccentric 40 engages a roll 44 (Fig. 8) on a forked lever 45 mounted on a fixed pivot 46. The depending arm 45a of the lever 45 has segmental teeth at its lower end which engage similar teeth on the adjacent end of a segment gear arm 48 which is loosely pivoted on a shaft 50 (Fig. 11) which supports the lower feed roll 32.

A feed pawl 54 (Figs. 8 and 12) on the arm 48 engages a ratchet wheel 55 fixed on the shaft 50 with which the roll 32 in integral. A spring-pressed holding pawl 57 is preferably provided for the ratchet wheel 55. The top feed roll 33 is geared above the roll 32 and is yieldingly pressed down by an adjustable spring 58 (Figs. 10 and 11).

A cam follower 60 (Fig. 8) is fixed to the lever 45 and extends rearward over the eccentric 40, so that the lever 45 is moved positively in both directions.

When the lever 45 is moved anti-clockwise as shown in Fig. 8, the feed rolls 32 and 33 are advanced. As the lever 45 is moved clockwise, the pawl 54 is moved backward to the next ratchet tooth.

The lever 45 may also have an upward extension 62 (Fig. 8) which may be connected rearward to feeding device (not shown) for the presser rolls 30.

By the feeding mechanism above described, the paper tube T is intermittently advanced in steps each corresponding to the width of a paper band. The tube advances over supporting plates 63 and 63a (Fig. 10) and under a fixed but yieldable guide-bar 64.

Cutting mechanism

Figure 6:
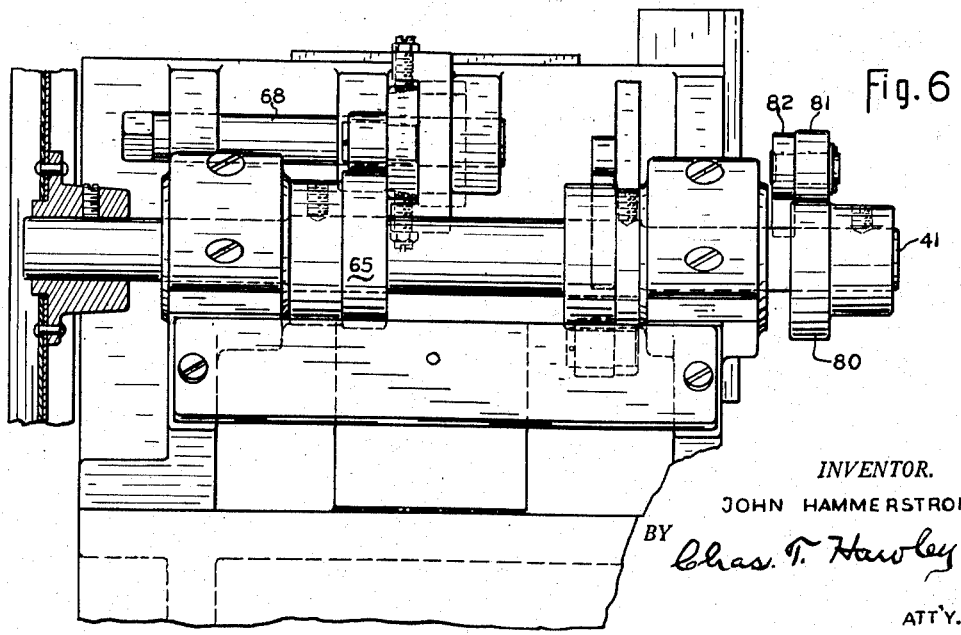
Fig. 6 is a rear elevation, looking in the direction of the arrow 6 in Fig. 5.

The mechanism for cutting successive bands from the end of the paper tube T is shown in Figs. 5, 6 and 8 and is actuated by a second cam or eccentric 65 which is also mounted on the driving shaft 41. The cam 65 is engaged by a roll 66 on the rear end of an arm 67 which is loosely pivoted on a fixed cross shaft or stud 68.

A lever 70 is also pivoted on the stud 68 and has lugs 71 (Fig. 8) in which screws 72 are threaded. These screws engage the opposite sides of the arm 67 and thus provide angular adjustment for the lever 70 which at its front end has a segmental head portion 73 extending into a bearing block 74 mounted in the upper end of a slide 75 which is slidable vertically at the front of the machine and which is intermittently moved by the cam 65. A cam follower 76 (Fig. 5) may be provided on the arm 67.

Shifting mechanism

The mechanism for accomplishing the transverse shift of the upper layer of each paper band is best shown in Figs. 5, 6, 7 and 9. This mechanism is operated by a cam 80 (Figs. 5 and 7) also mounted on the drive shaft 41. This cam engages a roll 81 on a lever 82 which is pivoted at 83. Springs 84 hold the roll against the cam 80.

This lever 82 has a stud 85 projecting laterally from the front end of the lever 82 and having a pin-and-slot connection to an angle plate 87 mounted to slide vertically on the corner of the main frame F.

A pin 88 (Fig. 9) in the angle plate 87 moves vertically with the plate and extends into a slot 89 in one end of a link 90. The slotted end of the link is supported on a stud 91 extending through a slot 92 in the link 90 and mounted in a fixed plate 91a (Fig. 5). The opposite end of the link is pivoted at 93 on a vertically-disposed arm 94 (Fig. 9), which in turn is pivoted at 95 to the frame F.

At its lower end, the arm 94 (Fig. 13) is pivoted at 96 to a bar 97 having a slot 98 to receive a pivot-pin or screw 99 in a plate 100. A spring 97a applies yielding downward pressure to the bar 97. The plate 100 is secured to the slide 75 by a screw 101 (Figs. 13 and 17) extending through a slot 102 in the plate 100. The vertical position of the pivot-pin or screw 99 may thus be adjusted to vary the vertical relation of the lever 97 to the slide 75.

A shift member 104 is secured to the free end of the bar 97 and a toothed plate 105 is fixed in the lower end of the member 104.

A knife or cutter 110 (Figs. 13 and 19) is mounted on the lower end of the slide 75 and will be hereinafter described.

With this construction, it will be seen that downward movement of the angle plate 87 and pin 88 will shift the link 90, arm 94, bar 97 and shift member 104 to the left in Fig. 9 until the pin 88 enters the straight vertical lower end portion of the slot 89, after which the shift member 104 and the toothed blade 105 will remain in the left-hand position shown in Fig. 14 until the shifted band B is pressed and ejected.

Cutting and pressing apparatus

The cutting and pressing apparatus is best shown in Figs. 9 and 10. The slide 75 is vertically reciprocated by the cam 65 (Fig. 5), acting through the lever 67. The knife or cutter 110 is mounted on the lower end of the slide 75. As the band is cut, the cutter slightly depresses a bed 111 which is yieldingly pressed upward by springs 111a (Fig. 9) which are mounted on the shouldered upper ends of screws 112. Upward travel of the bed 111 is limited by stop plates 113.

A plate 114 (Fig. 10) is secured by screws 115 to the front side of a cross frame member 116, and the plate 114 supports fixed blades 118 across which the severed bands B are successively advanced.

Plungers or presser feet 120 (Figs. 10, 13 and 15) are formed on brackets 125 (Figs. 7 and 10), and these brackets are secured to an angle plate 126 which extends transversely in advance of the slide 75 and which is secured at its left-hand end to the vertically-reciprocated angle plate 87.

These yielding plungers or presser feet 120 act to press down the ends of the shifted band B as shown in Fig. 14, and coact with depressions 123 in the upper edge of the fixed plate 114.

Spaced guide-rolls 127 (Fig. 10) are mounted on the angle-plate 126 and prevent forward displacement of the bands during the shifting and pressing operations.

A guide-plate or deflector 130 (Figs. 15 and 16) is secured to the front of the plate 114 and guides the ejected bands to any suitable receptacle. A yielding guide-plate 132 (Fig. 7) assists in directing the tube T to the feed rolls 32—33.

General operation

The main shaft 41 is continuously rotated and operates through the feed rolls and ratchet mechanism to intermittently advance the folded and glued paper tube T. The knife 110 is vertically reciprocated to sever successive bands B from the front end of the tube T. As the knife is raised, the tube is again fed forward and the severed band B is thereby twice advanced to attain a position over the toothed blades 118 and under the shifting blade 105. This blade is then shifted to the left in Fig. 9 to slide the upper layer of the band to the left as shown in Figs. 1 and 4. The lower layer of the band is held stationary by the fixed toothed blades 118.

The angle plate 87 continues to move downward after the shifting operation, such movement being permitted by the vertical end portion of the slot 89, and during this continued downward movement, the presser feet 120 press the shifted ends of the band downward into the depressions 123 in the fixed plate 114 as indicated in Fig. 14.

The angle plate 87 is then moved upward, lifting the presser feet away from the band, and at the same time the slide 75 moves upward, raising the shifting blade 105 away from the band.

As the band B is then advanced to shifting position, the finished band thus released is pushed off of the supporting blades 118 and falls onto the guide-plate 130 and thence to a suitable receptacle.

The timing of the several operations for each full rotation of the main shaft 41 is clearly shown in Fig. 20. The point a is assumed to be the point at which the paper feed has been completed and the tube T has been projected the width of one band under the knife 110.

As the shaft 41 rotates to the point b, the slide 75 and the knife 110 are moved down to cut the band, and the shifting blade 105 has also been moved down to engage the upper surface of a previously severed band.

As the shaft advances from b to c, the shifting blade 105 is moved to the left from the position shown in Fig. 13 to the position shown in Fig. 14. This shifts the upper layer of the band lengthwise and brings the tabs 35 and 36 out of vertical alignment, as shown in Fig. 4. At the same time, the presser feet 120 start downward.

The pressing movement is completed at the angular position d, after which the knife 110 and the presser blade 105 on the slide 75 begin their upward movement, as indicated at the point e.

The presser feet 120 are then lifted away from the finished band, as indicated at *f*, and the shifting blade 105 is given a return movement to the right or to the position shown in Fig. 13 as the shaft 41 reaches the point *g*.

As the shaft 41 then completes its rotation to the starting point *a*, the feed rolls 32 and 33 are operated to feed a new portion of the tube T forward into cutting position and to advance the severed band toward the shifting and pressing mechanism.

The machine operates continuously and successive bands are produced and reformed with dis-aligned tabs with great rapidity.

Bands made by my improved process are found to be more quickly and easily handled and are better adapted for their intended purposes.

Having thus described my invention and the advantages thereof, I do not wish to be limited to the details herein disclosed, otherwise than as set forth in the claims, but what I claim is:

1. The process of making a paper band which consists in forming a flattened paper tube having superposed upper and lower layers, cutting successive narrow tubular paper band from said tube, each band being of substantially uniform transverse width in all parts but having certain superposed portions in the two layers out of transverse alignment with certain other and adjacent superposed portions and the transversely-corresponding portions in the two layers being initially in exact vertical alignment, shifting and offsetting one layer lengthwise of the band relative to the other layer to bring said transversely-corresponding portions out of vertical alignment with each other, and flattening the end portions of the band while in its shifted and offset condition.

2. In a machine for making paper bands, means to supply a flattened paper tube, means to cut successive narrow bands of substantially uniform width in all parts and having superposed upper and lower layers from the end of the flattened paper tube, said bands having certain adjacent upper and lower edge portions vertically aligned but out of transverse alignment, means to shift one layer lengthwise relative to the other layer to position said transversely dis-aligned edge portions in the two layers out of vertical alignment, and means to flatten the end portions of each band in its shifted condition.

3. In a machine for making paper bands, means to supply a flattened paper tube, means to cut successive narrow bands of substantially uniform width in all parts and having superposed upper and lower layers from the end of the flattened paper tube, said bands having certain adjacent upper and lower edge portions vertically aligned but out of transverse alignment, means to shift one layer lengthwise relative to the other layer to position said transversely dis-aligned edge portions in the two layers out of vertical alignment, and means to flatten the end portions of each band in its shifted condition, and the shifting means comprising coacting toothed fixed and movable blades engaging the superposed layers of the paper band and means to move the movable blade relative to the fixed blade and lengthwise of the band.

References Cited in the file of this patent

UNITED STATES PATENTS

| 259,238 | Stocking | June 6, 1882 |
| 361,548 | Richards | Apr. 19, 1887 |
| 2,106,431 | Jones | Jan. 25, 1938 |

FOREIGN PATENTS

| 678,290 | Great Britain | Sept. 3, 1952 |